US007001968B2

(12) United States Patent
McDaniel et al.

(10) Patent No.: US 7,001,968 B2
(45) Date of Patent: *Feb. 21, 2006

(54) OLEFIN POLYMERIZATION PROCESSES AND PRODUCTS THEREOF

(75) Inventors: Max P. McDaniel, Bartlesville, OK (US); Elizabeth A. Benham, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 14 days.

This patent is subject to a terminal disclaimer.

(21) Appl. No.: 10/462,502

(22) Filed: Jun. 16, 2003

(65) Prior Publication Data

US 2003/0216525 A1 Nov. 20, 2003

Related U.S. Application Data

(62) Division of application No. 09/923,641, filed on Aug. 7, 2001, now Pat. No. 6,627,702, which is a division of application No. 09/216,338, filed on Dec. 18, 1998, now Pat. No. 6,294,494.

(51) Int. Cl.
*C08F 110/02* (2006.01)

(52) U.S. Cl. .................... 526/352; 526/156; 526/158; 526/64; 502/103; 502/104; 502/87

(58) Field of Classification Search ............ 526/64, 526/352, 156, 158; 502/103, 104, 87
See application file for complete search history.

(56) References Cited

U.S. PATENT DOCUMENTS

| | | | | |
|---|---|---|---|---|
| 3,255,167 A | * | 6/1966 | Thomas | 526/156 |
| 3,840,508 A | | 10/1974 | Ballard et al. | |
| 3,971,767 A | | 7/1976 | Setterquist | |
| 4,056,669 A | | 11/1977 | Ballard et al. | |
| 5,096,868 A | | 3/1992 | Hsieh et al. | |
| 5,604,170 A | | 2/1997 | Sano et al. | |
| 5,919,723 A | | 7/1999 | Milani et al. | |

* cited by examiner

*Primary Examiner*—Ling-Sui Choi
(74) *Attorney, Agent, or Firm*—Womble Carlyle Sandridge & Rice, PLLC

(57) ABSTRACT

A novel loop/slurry olefin polymerization process is provided which produces ultra-high molecular weight ethylene homopolymer.

31 Claims, No Drawings

OLEFIN POLYMERIZATION PROCESSES AND PRODUCTS THEREOF

CROSS-REFERENCE TO RELATED APPLICATIONS

This application is a divisional application of U.S. patent application Ser. No. 09/923,641, filed Aug. 7, 2001, now U.S. Pat. No. 6,627,702, which is a divisional application of U.S. patent application Ser. No. 09/216,338, filed Dec. 18, 1998, now U.S. Pat. No. 6,294,494, both of which are incorporated herein in their entirety by reference.

BACKGROUND

This invention relates to olefin polymerization processes and the resultant polymer products.

Ultra-high molecular weight olefin polymers, such as polyethylene, are useful in many demanding and extremely critical applications, such as human joint replacements, gears, bullet proof vests, skis, and other applications. Since ultra-high molecular weight polymers cannot be pelletized after leaving the reactor, the polymer must be sold as a fluff or a powder. Therefore, particle size and toughness of the resultant polymer is critical.

Many commercial methods are available to produce olefin polymers, such as polyethylene. One of the most economical routes to most commercial grades of olefin polymers is a continuous loop/slurry process with a paraffin diluent wherein the polymerization process carried out at a temperature low enough that the resulting polymer is largely insoluble in the diluent. Unfortunately, most commercially acceptable ultra-high molecular weight polyethylenes traditionally are made using a stirred tank, i.e., batch process, in a heavy hydrocarbon diluent.

SUMMARY OF THE INVENTION

Therefore, it is an object of this invention to provide a novel catalyst system which can produce polyethylene.

It is another object of this invention to provide a novel catalyst system which can produce very tough, ultra-high molecular weight polyethylene.

It is still another object of this invention to provide a very tough, ultra-high molecular weight polyethylene.

It is a further object of this invention to provide an improved olefin polymerization process.

It is yet another object of this invention to provide an improved polymerization process for preparing ultra-high molecular weight polyethylene.

In accordance with this invention, a process is provided to polymerize ethylene in a loop/slurry process using a zirconium-containing catalyst system to produce a very tough, ultra-high molecular weight polyethylene.

In accordance with another embodiment of this invention, a very tough, ultra-high molecular weight polyethylene is provided.

In accordance with another embodiment of this invention an exceptionally broad molecular weight distribution polyethylene is provided.

In accordance with still another embodiment of this invention a polymerization process to produce an exceptionally broad molecular weight distribution polyethylene is provided.

DESCRIPTION OF THE PREFERRED EMBODIMENTS

Catalyst System Supports

Supports of the catalyst system of this invention must be alumina-containing material. As used in this disclosure, the term "support" refers to a carrier for another catalytic component. However, a support is not necessarily an inert material; a support can contribute to catalytic activity and/or catalytic productivity. Furthermore, a support can have an effect on the properties of the resultant polymer produced.

The alumina-containing material used in this invention can contain other ingredients which are present to produce some unrelated result and/or which do adversely affect the quality of the final catalyst system. For example, other metal oxides, such as boria, magnesia, silica, thoria, titania, zirconia, and mixtures thereof, can be present without adverse affects. Preferably, the support is at least 75 weight percent alumina, preferably 85 weight percent alumina, based on the weight of the alumina-containing material, in order to achieve optimum catalyst system quality, as well as improved polymer characteristics. Often, the alumina will comprise some silica.

The alumina-containing material, hereinafter also referred to as "alumina" or "base alumina", must have a high surface area, large pore volume, and must be calcined prior to use. Usually, the surface area of the alumina, after one hour of calcination at 600° C., will be greater than about 200 square meters per gram ($m^2/g$) and preferably within a range of about 200 to about 600 $m^2/g$. Most preferably, the alumina will have a surface area within a range of about 250 to about 500 $m^2/g$ for easier catalyst loading, improved productivity, and greater durability. Usually, the pore volume of the alumina will be greater than about 0.5 milliliters per gram (ml/g) and preferably within a range of about 1.0 to about 2.5 ml/g. Most preferably, the alumina will have a pore volume within a range of 1 to 2 ml/g for greater durability.

Exemplary aluminas are commercially available. Preferred commercially available aluminas are commonly referred to as Ketjen B or Ketjen L aluminas. Typical Ketjen B or Ketjen L aluminas, as used in the present invention, will have typical analyses as given in Table A, below.

TABLE A

|  | Ketjen B | Ketjen L |
| --- | --- | --- |
| Loss on ignition (1 hr., 1000° C., wt. % base) | 25 | 25 |
| Chemical Composition (wt. % cure base) |  |  |
| Alumina, $Al_2O_3$ | Balance | Balance |
| Sodium oxide, $Na_2O$ | 0.1 | 0.15 |
| Sulfate, $SO_4$ | 1.5 | 2.0 |
| Silicon dioxide, $SiO_2$ | 1.0 | 5.0 |
| Iron, Fe | 0.03 | 0.03 |
| Physical Properties |  |  |
| Surface Area, $m^2/g$ (1 hr., 600° C.) | 340 | 380 |
| Apparent bulk density, g/ml | 0.3 | 0.3 |
| Pore Size Distribution (radius) |  |  |
| <37.5 Å, ml/g | 0.20 | 0.20 |
| 37.5–100 Å, ml/g | 0.18 | 0.18 |
| 100–1000 Å, ml/g | 0.74 | 0.74 |
| 1000–10,000 Å ml/g | 0.51 | 0.71 |
| 10,000–75,000 Å ml/g | 0.15 | 0.17 |
| Total pore volume, ml/g | 1.78 | 2.00 |

TABLE A-continued

| | Ketjen B | Ketjen L |
|---|---|---|
| Particle Size Distribution (wt %) | | |
| <149 micron | 98 | 95 |
| <105 micron | 65 | 60 |
| <74 micron | 39 | 30 |
| <40 micron | 19 | 15 |
| Average particle size, micron | 85 | 95 |

Prior to treatment with or contacting any additional support components or the active catalytic component, the alumina must be calcined. The alumina is calcined under conditions of temperature and time sufficient to convert substantially all of the alumina hydrate to gamma-alumina and to remove substantially all water. Generally, temperatures within a range of about 3000 to about 900° C., for times within a range of about 1 minute to about 48 hours are sufficient. Temperatures under about 300° C. and times of less than about one minute can be insufficient to covert substantially all of the alumina to gamma-alumina. Temperatures of greater than about 900° C. and times of greater than about 48 hours do not convert a significantly greater portion of the alumina to gamma-alumina. Preferably, calcination temperatures within a range of about 500° to about 800° C. and times within a range of about 30 minutes to about 24 hours are employed. Most preferably, temperatures within a range of about 500° to about 700° C. and times within a range of about 1 hour to about 6 hours are employed. The calcining can be carried out under an oxidizing, reducing, or inert atmosphere; the principal purpose of the atmosphere is to sweep away moisture. However, for ease of use air is the preferred calcination atmosphere. As used in this disclosure, the terms "gamma-alumina", "calcined alumina", and "calcined, gamma-alumina" are used interchangeably and refer to the calcined alumina, described above.

Optionally, the alumina can be fluorided wherein the alumina support is treated with fluorine-containing compound. Exemplary fluoriding treatments can be found in U.S. Pat. No. 5,171,798 (McDaniel et al.), herein incorporated by reference. The alumina also can be treated with a phosphating agent to provide a phosphated-alumina. Exemplary phosphating methods are described in U.S. Pat. No. 5,001,204 (Klendworth et al.), herein incorporated by reference.

According to one embodiment of this invention, the particle size of the ultra high molecular weight polymer fluff is critical. It has been found that a correct selection of particle size of the catalyst system support particles can control the particle size of the resultant polymer fluff. Usually, catalyst system support particles are within a range of about 1 to about 40 microns, preferably within a range of about 2 to about 20 microns. Most preferably, in order to have an optimally sized polymer product, catalyst support particles are kept within a size range of 4 to 16 microns.

Catalyst System

Novel catalyst systems used in the present invention must contain zirconium. Zirconium can be combined with the catalyst system support in accordance with any method know in the art. Preferably, a zirconium halide, such as for example zirconium tetrachloride ($ZrCl_4$), is dissolved in an anhydrous, non-protic, polar solvent. Exemplary solvents include, but are not limited to, tetrahydrofuran, acetonitrile, and mixtures thereof. Alternatively, the zirconium halide can be dissolved in a hydrocarbon such as, for example, toluene, in which about 1 to about 2 moles of an alcohol, such as, for example, butanol, per mole of zirconium has been added. The zirconium halide solution can be mixed slowly, or slurried with, the catalyst system support.

The solvent must be evaporated to dryness under an inert atmosphere to yield a catalyst system. In order to insure complete removal of excess solvent, drying, or curing, of the catalyst system in a fluidized inert atmosphere, under temperatures and times sufficient to remove any excess solvent can be used. Usually, cure temperatures of greater than about 200° C. is sufficient. Preferably a cure temperature above about 250° C. is used. Most preferably, cure temperatures within a range of 250° C. to 600° C. is used for best catalyst system activity. The resultant catalyst system can be stored under an inert atmosphere until ready for use.

If a zirconium compound other than a zirconium halide is used, such as a zirconium alkoxide or a zirconyl salt, then the alumina need not necessarily be calcined prior to incorporation of the zirconium. However, it is preferred that the zirconium containing alumina then be given an elevated temperature halide treatment. Such treatments can consist of exposing the material to halide containing vapor, such as carbon tetrachloride, at elevated temperatures. Haliding agents can be any organic or inorganic liquid or vapor containing halide, such as silicon tetrachloride, chloroform, titanium tetrachloride, boron trichloride, hydrogen chloride, silicon hydrotrichloride, etc. Haliding temperatures can be from 200° C. to 800° C., preferably from 300° C. to 600° C., most preferably from 300° C. to 500° C. for best haliding results.

Zirconium usually is present in the catalyst system in an amount within a range of about 0.01 to about 15 weight percent, preferably within a range of about 0.1 to about 10 weight percent, based on the total mass of the catalyst system (support plus zirconium compound). Most preferably, zirconium is present in the catalyst system in an amount within a range of 4 to 8 weight, percent based on the total mass of the catalyst system for best catalyst system activity and productivity, as well as best polymer product particle size.

According to another embodiment of this invention, the inventive, novel zirconium containing catalysts systems can be used in combination with a second catalyst system in the presence of hydrogen to produce an exceptionally broad molecular weight distribution polymer. This second catalyst system contains titanium halide and is commonly referred to as a "Ziegler-Natta" catalyst. Commercially available titanium catalyst systems typically comprise complexes of titanium halides and magnesium with organometallic compounds, such as aluminum alkyls. Exemplary Ziegler-Natta, or magnesium/titanium, catalyst systems include, but are not limited to, those disclosed in U.S. Pat. Nos. 4,394,291; 4,326,988 and 4,347,158, herein incorporated by reference.

These two catalyst systems can be combined by any method known in the art. For example they can be premixed prior to being introduced into the reactor. Or preferably the two catalyst systems can be fed to a polymerization reactor independently through two separate feed streams. An aluminum alkyl cocatalyst must be used, and hydrogen must be added to the polymerization reactor. The amount of hydrogen in the reactor can vary from about 0.1 mole percent to about 0.2 mole percent based on the weight of the diluent. Comonomer, such as 1-hexene, also can be added to regulate the density of the polymer if desired.

While not wishing to be bound by theory, it is believed that the novel zirconium containing catalysts of this invention are significantly less sensitive to hydrogen as a molecular weight regulator than are the titanium containing catalysts. Thus, by using both catalyst systems in a single polymerization reactor, with a sufficiently high concentration of hydrogen, so called "bimodal" polymers can be produced having a broad molecular weight distribution because the zirconium catalyst system can produce an ultrahigh molecular weight polymer and the titanium catalyst system can produce a low molecular weight polymer.

Cocatalyst

Catalyst systems of the present invention must be used with a cocatalyst. Cocatalysts useful in the present invention must be an aluminum alkyl cocatalyst, as expressed by the general formulae $AlR_3$, $AlR_2X$, and/or $AlRX_2$, wherein R is an alkyl group having from about 1 to about 12 carbon atoms per alkyl group and X is a halogen atom. Exemplary aluminum alkyl cocatalysts include, but are not limited to triethylaluminum (TEA), triisobutyl aluminum (TIBAL), diethylaluminum chloride (DEAC), ethylaluminum sesquichloride (EASC), and mixtures of two or more thereof. Preferably, the cocatalyst is a trialkyl aluminum cocatalyst, such as TEA, TIBAL and mixtures thereof for best catalyst system activity and reactivity.

The cocatalyst can be combined with the catalyst system in accordance with any method known in the art. Another cocatalyst addition method is to directly add cocatalyst to the reactor either prior to or simultaneously with the novel supported zirconium catalyst system. An additional method of adding cocatalyst is to precontact supported zirconium catalyst with cocatalyst, prior to addition to the reactor.

Generally, the cocatalyst can be present in the reactor in an amount within a range of about 1 to about 500 mg/kg (ppm), based on the weight of diluent, such as isobutane, in the reactor. Preferably, the cocatalyst is present in the reactor in an amount within a range of about 5 to about 100 mg/kg in order to optimize catalyst system activity and productivity. As stated earlier, precontacting catalyst and cocatalyst can occur, but is not required. While not wishing to be bound by theory, it is believed that precontacting catalyst system and cocatalyst can reduce the quantity of cocatalyst used in the reactor.

Reactants

Polymers produced in accordance with the process of this invention predominately are homopolymers of ethylene or copolymers of ethylene and higher alpha-olefin comonomers. For ultra-high molecular weight (UHMW) polyethylene, trace amounts of comonomers can be present, but comonomers preferably are not present in any significant amount since comonomers can reduce the molecular weight of the desired ultra-high molecular weight polymer product. Preferably, ethylene concentration in the polymerization reactor is within a range of from about 2 weight percent to about 15 weight percent, based on the total liquid contents of the reactor. Most preferably, ethylene concentration in the polymerization reactor is within a range of from about 4 to about 7 weight percent. While ethylene concentration does not significantly affect the molecular weight of the resultant polymer, higher or lower ethylene concentration can effect catalyst activity.

Polymerization Process

Polymerization of the monomer must be carried out under continuous loop/slurry, also known as particle form, polymerization conditions wherein the reactor temperature is kept below the temperature at which polymer swells. Such polymerization techniques are well known in the art and are disclosed, for instance, in Norwood, U.S. Pat. No. 3,248,179, herein incorporated by reference. A loop/slurry polymerization process is much more preferred than a stirred tank reactor because a loop reactor has a greater heat transfer surface, much more versatility for plant operation, usually less polymer swelling during polymerization, and diluent can be flashed off, eliminating the necessity of separating polymer product from solvent.

To produce UHMW polyethylene, the temperature of the polymerization reactor, or reaction zone, according to this invention, is critical and must be kept within a range of about 170° F. to about 230° F. (76° C. to 110° C.), or about 170° F. to about 220° F. (78° C. to 105° C.), preferably within a range of about 180° F. to about 210° F. (82° C. to 99° C.). Most preferably, the reaction zone temperature is within a range of 190° F. to 200° F. (87° C. to 94° C.). The temperature range is critical in order to produce an ultrahigh molecular weight polyethylene. Too high of a reactor temperature can produce a polymer with too low of a molecular weight; too low of a reactor temperature can make the polymerization process inoperable because a lower reactor temperature can be difficult to control due to the exothermic polymerization reaction, flashing off reactor diluent can be difficult, and a lower reactor temperature can produce a polymer with a commercially unacceptable (too low) molecular weight. To produce other types of polymers, higher reactor temperatures can be used.

The loop/slurry process used in this invention must be carried out in an inert diluent (medium) selected from the group consisting of hydrocarbons having three and four carbon atoms per molecule. Exemplary diluents include, but are not limited, to propane, n-butane, isobutane, and mixtures thereof. Diluents having more or less than three or four carbon atoms per molecule can be difficult to separate from the polymer product during the polymer recovery process. Isobutane is the most preferred diluent due to low cost and ease of use.

Pressures in the loop/slurry process can vary from about 110 to about 1000 psia (0.76–4.8 MPa) or higher, preferably 500 to 700 psia. The catalyst system is kept in suspension and is contacted with ethylene at a pressure sufficient to maintain the diluent and at least a portion of the ethylene in a liquid phase. The reactor diluent and temperature thus are selected such that the polymer is produced and recovered as solid particles. Catalyst system concentrations in the reactor can be such that the catalyst system content ranges from 0.0001 to about 0.1 weight percent based, on the weight of the reactor contents.

To produce UHMW polyethylene, hydrogen never is added to the polymerization reactor because hydrogen has too great of an effect on the molecular weight of the resultant polymer. For other types of polymers, hydrogen can be added to the reactor to control molecular weight.

Products

UHMW polymers produced in accordance with this invention are considered homopolymers of ethylene, even though trace, insignificant amounts of comonomers can be present in the resultant polymer. Polymers produced according to this invention have a weight average molecular weight ($M_w$), generally above one million (1,000,000), are considered ultra-high molecular weight polymers. Preferably, polymers produced in accordance with this invention have a weight average molecular weight of greater than about two million (2,000,000) and most preferably, within a range of greater than or equal to about 2,500,000 up to about 10,000,000.

Since the molecular weight of these polymers is so high, the polymers exhibit a value of zero (0) for both the melt index (MI) and high load melt index (HLMI). The inherent viscosity (IV) of the polymers generally is greater than about 19, preferably within a range of about 20 to about 30. Most preferably, the polymers will have an IV within a range of 22 to 28.

The density of these novel polymers usually is within a range of about 0.92 g/cc to about 0.94 g/cc, preferably from about 0.925 to about 0.936 g/cc. Most preferably, polymer density is within a range of about 0.927 to about 0.933 g/cc.

Another critical, defining physical characteristic of these polymers is the fluff, or powder, size. Usually, the particle size is less than about 400 microns (40 mesh), preferably within a range of about 400 microns to about 40 microns (300 mesh). Most preferably, the particle size is within a range of about 50 to about 400 microns. Particle sizes of larger that about 400 microns often can appear in the in the finished product as a flaw, or a white patch. While not wishing to be bound by theory, it is believed that this defect appears because the particles are not molded by typical methods in the art, but are merely fused together by compression. Particles that are too fine, or small, can inhibit transport of the polymer fluff (powder) through conveyor blowers because the fine particles can cling to walls by static and can plug downstream filters due to blowover.

Polymers produced according to this invention must be very tough, as evidenced by the sand wheel abrasion test, tensile strength, elongation, flexural modulus, hardness and Izod impact strength.

High bulk density also is important because bulk density is related to the amount of compression of the polymer during fusion. A low bulk density can inhibit and slow down processing rates. Generally, polymers produced in accordance with this invention have a bulk density of greater than about 0.25 g/cc, preferably, greater than about 0.3 g/cc. Most preferably, polymer bulk density is within a range of 0.35 to 1 g/cc.

A further understanding of the present invention and its advantages are provided by reference to the following examples.

According to another embodiment of this invention, novel zirconium containing catalyst systems of this invention can be used in combination with a second catalyst system in the presence of hydrogen to produce an exceptionally broad molecular weight distribution polymer. This second catalyst system comprises a titanium halide and a magnesium compound and is commonly referred to as a "Ziegler-Natta" catalyst system. Commercially available titanium catalyst systems typically comprise complexes of titanium halides with organometallic compounds, such as, for example, aluminum alkyls. Exemplary magnesium/titanium catalyst systems include, but are not limited to, those disclosed in U.S. Pat. Nos. 4,394,291; 4,326,988; and 4,347,158, herein incorporated by reference.

The two catalyst systems can be combined by any method known in the art. For example, they can be premixed prior to being introduced into a polymerization reactor. Or preferably, the two catalyst systems are fed to the reactor independently through two separate feeders. An aluminum alkyl cocatalyst must be used, and also hydrogen must be added to the reactor. The amount of hydrogen in the reactor can vary from 0.1 mole percent to 2.0 mole percent based on the weight of the diluent. Comonomer, such as 1-hexene, also can be added to regulate the density of the polymer if desired.

While not wishing to be bound by theory, it is believed that the novel zirconium containing catalyst system of this invention are significantly less sensitive to hydrogen as a molecular weight regulator than are the titanium-containing catalysts. Thus, by using both catalyst systems in a single polymerization reactor, with a sufficiently high concentration of hydrogen, so called "bimodal" polymers are produced having a broad molecular weight distribution because the novel zirconium catalyst system can produce an ultrahigh molecular weight polymer portion and the titanium catalyst system can produce a low molecular weight portion polymer.

EXAMPLES

The following Examples illustrate various aspects of the invention and the invention is not to be construed or limited thereby. Data are included in the examples about catalyst system preparation, polymerization conditions, as well as the resultant polymer. All chemical handling, including reactions, preparations and storage, was preformed under a dry, inert atmosphere (usually nitrogen), unless otherwise indicated. Unless otherwise indicated, bench scale polymerizations were completed in a 2.6 liter autoclave reactor at 95° C. using an isobutane (1.2 liters) slurry. Catalyst system was charged to the reactor against a counter current of isobutane. Hydrogen, unless indicated otherwise, was not added to the reactor. Isobutane was flushed into the reactor with a small amount of ethylene. Where applicable, comonomer was added, followed by ethylene to bring the total reactor pressure to 550 psig. Cocatalyst, if used either was prepared with the catalyst system and supported simultaneously with the zirconium halide or was added to the reactor vessel simultaneously with the catalyst system using two different reactor inlet streams. Usually, cocatalyst was prepared to be a 15 weight percent solution of TEA in hexanes. Unless otherwise indicated, 1 milliliter of this cocatalyst solution was used. Other cocatalysts used are disclosed in each specific example. After one liter of isobutane liquid was added, ethylene then was supplied on demand to maintain a reactor pressure of 550 psig. Reaction time usually was about 30 minutes and then the stirrer was turned off and all volatiles were flashed to recover polymer.

Catalyst systems generally were prepared by slowly adding 1 gram of zirconium tetrachloride ($ZrCl_4$) to 100 milliliters of acetonitrile to form a clear, colorless solution. Ketjen B alumina commercially available from Davison Chemical Company, a division of W.R. Grace and Co., having a pore volume of 1.6 ml/g, and a surface area of about 400 m$^2$/g was calcined in dry air for three (3) hours at 600° C. and cooled to room temperature under dry nitrogen. Then, 8.6 grams of the pre-calcined alumina was slurried with 62 ml of the $ZrCl_4$ solution. The slurry then was evaporated to dryness under nitrogen, yielding a catalyst system containing 7.3 weight percent zirconium (as Zr). After dryness had been reached, the remaining excess acetonitrile was removed by curing the solid in fluidizing nitrogen at 300° C. for half a hour.

Polymer was collected from each run and tested according to the following procedures:

Density (g/ml): ASTM D 1505-68 and ASTM D 1928, Condition C. Determined on a compression molded sample, cooled at about 15° C. per minute, and conditioned at room temperature for about 40 hours.

High Load Melt Index (HLMI)(g/10 min): ASTM D1238-95, condition E, determined at 190° C. with a 21,600 gram weight.

Melt Index (MI) (g/10 min): ASTM D1238-95, determined at 190° C. with a 2,160 gram weight.

Intrinsic Viscosity (dl/g): ASTM D4020-92, modified by using 0.015 wt % dissolved polymer rather than 0.05 wt %. The change is made to get better dissolution of polymer, which can be difficult to dissolve. This procedure includes a definition of ultrahigh molecular weight polymers.

Molecular Weight Distribution: Molecular weights and molecular weight distributions were obtained using a Waters 150 CV gel permeation chromatograph with trichlorobenzene (TCB) as the solvent, with a flow rate of 1 mL/minute at a temperature of 140° C. BHT (2,6-di-tert-butyl-4-methylphenol) at a concentration of 1.0 g/L was used as a stabilizer in the TCB. An injection volume of 220 μL was used with a nominal polymer concentration of 0.3 g/l (at room temperature). Dissolution of the sample in stabilized TCB was carried out by heating at 160–170° C. for 20 hours with occasional, gentle agitation. The columns were two Waters HT-6E columns (7.8×300 mm). The columns were calibrated with a broad linear polyethylene standard (Phillips Marlex® BHB 5003) for which the molecular weight had been determined.

Example 1

Catalyst system was prepared as described above and polymerization was performed as described above using 0.5320 grams of catalyst system and one milliliter of 15 weight percent TEA. Polymerization run time was 32 minutes. The results are listed below in Table 1.

TABLE 1

| Run | MI, g/10 mins | HLMI, g/10 mins | Density, g/cc | Activity, g pol/gcat/hr | IV, dl/g |
|---|---|---|---|---|---|
| 101 | 0 | 0 | 0.931 | 1220 | 19.4 |

The data in Table 1 show that the resultant polymer is an ultra-high molecular weight polyethylene.

Example 2

Catalyst systems were prepared as described above, however the final cure temperature of the catalyst system was not 300° C. but was varied. Polymerizations were carried out as described above. The data is given below in Table 2.

TABLE 2

| Run | Cure Temperature, ° C. | Activity, g pol/g cat/hr |
|---|---|---|
| 101 | 300 | 1220 |
| 201 | 150 | 114 |
| 202 | 200 | 340 |
| 203 | 250 | 800 |

Example 2 shows that catalyst system cure temperature has a significant impact on activity of the catalyst system and that cure temperatures within a range of 300° C. to 900° C. are optimal for catalyst system activity.

Example 3

Catalyst systems were prepared and polymerization reactions were carried as described above. However, cocatalyst was varied, as shown below in Table 3. All cocatalyst solutions were prepared in a solution of hexanes. The data in Table 3 show that an alkylaluminum cocatalyst is necessary for polymerization to occur and that triethylaluminium (TEA) is preferable to trimethylaluminium (TMA).

TABLE 3

| Run | Cocatalyst | Quantity Cocatalyst | Activity, g pol/g cat/hr |
|---|---|---|---|
| 101 | TEA | 1 ml of 15 wt. % | 1220 |
| 301 | TMA | 1 ml of 9.5 wt. % | 410 |
| 302 | dibutyl magnesium | 1 ml of 0.7 molar solution | none |

Example 4

Example 4 demonstrates curing the catalyst system in the presence of hydrogen rather than nitrogen. The data in Table 4 show that hydrogen reduction treatment does not improve catalyst system activity; however, hydrogen reduction treatment also does not significantly decrease catalyst system activity.

TABLE 4

| Run | Treatment | Activity, g pol/g cat/hour |
|---|---|---|
| 101 | no $H_2$ during curing | 1220 |
| 401 | $H_2$ during curing | 1060 |

Example 5

Example 5 demonstrates the optional use of metal alkyl pretreatment of the catalyst system. The procedure described above was repeated to yield a dry, white catalyst system. Then, 5.4 grams of catalyst system was slurried with about 25 ml of dry heptane, to which triethylaluminum (TEA) was added in an amount of 2 moles of aluminum per mole of zirconium on the catalyst system support. The heptane was evaporated at about 75° C. under flowing nitrogen, yielding a brown catalyst system. Polymerization reaction time was 7.5 minutes. Runs 501 (a), (b), and (c) use the same catalyst system. Catalyst system preparation was repeated to make the catalyst system used in Run 502 (a) and (b). Runs 501 (a) and (c) and 502 (a) had no additional cocatalyst added to the polymerization reactor; Runs 501 (b) and 502 (b) had additional cocatalyst added to the reactor. The data are given below in Table 5.

TABLE 5

| Run | Additional Cocatalyst | Amount Additional Cocatalyst | Activity, g pol/g cat/hr |
|---|---|---|---|
| 501 (a) | No | — | 1740 |
| 501 (b) | Yes | 1 ml of 15% TEA | 1132 |
| 501 (c) | No | — | 1072 |
| 502 (a) | No | — | 1490 |
| 502 (b) | Yes | 1 ml of 15% TEA | 1060. |

The data in Table 5 shows that the addition of concentrated cocatalyst to the supported zirconium catalyst system outside of the reactor can produce a catalyst system that is more active than a similar catalyst system wherein the cocatalyst is only added to the reactor. However, adding extra aluminum alkyl cocatalyst in the reactor to thus pre-treated catalyst system seems to retard its activity. The decrease in activity from 501 (a) to 501 (c) may be an indication that the catalyst system does not age well at room temperature.

Example 6

This example demonstrates catalyst system preparations wherein the catalyst system is pretreated with a metal alkyl other than triethylaluminum. The procedure described in Example 5 was repeated wherein the catalyst system was pretreated with a metal alkyl prior to curing, except as described in Table 6. One ml of 15 weight % triethylaluminum was added to the reactor in each Run except for Runs 601(a) and 602. All catalyst systems were prepared to result in 2 moles of cocatalyst metal (zinc, aluminum, magnesium or lithium) per mole of zirconium in the catalyst system. The results are given below in Table 6.

TABLE 6

| Run | Pre-Treatment | TEA added to Reactor | Activity, g pol/g cat/hr |
|---|---|---|---|
| 601 (a) | Zn(Et)$_2$[a] | No | 0 |
| 601 (b) | Zn(Et)$_2$[a] | Yes | 1300 |
| 602 | TMA[b] | No | 300 |
| 603 | None | Yes | 960 |
| 604 | TMSM MgCl[c] | Yes | 460 |
| 605 | n-butyl lithium | Yes | trace polymer |
| 606 | di-isobutyl aluminum hydride | Yes | 850 |
| 607 | TIBAL | Yes | 40 |

[a]Zn(Et)$_2$ is diethyl zinc
[b]TMA is trimethylaluminum
[c]TMSM MgCl is trimethylsilylmethyl magnesium chloride The data in Table 6 show that even though other metal alkyl compounds can be used during catalyst system preparation, an alkyl aluminum compound needs to be used in order to have an effective polymerization catalyst system.

Example 7

The following example demonstrates different the levels of zirconium tetrachloride (ZrCl$_4$) in the catalyst system. Varying amounts of zirconium tetrachloride were impregnated on the alumina support. The results, given below in Table 7, show that the optimum zirconium loading is about 7 weight percent.

TABLE 7

| Run | ZrCl$_4$ Loading (weight %) | Activity, g pol/g cat/hr |
|---|---|---|
| 101 | 7.3 | 1220 |
| 701 | 2 | 185 |
| 702 | 4 | 580 |
| 703 | 12 | 1020 |
| 704 | 16 | 800 |

Example 8

The following data show polymerization results using supports other than alumina. Catalyst preparation procedures and polymerization procedures, as described in the introduction to the examples, were followed. Any variants to the catalyst preparation procedure relate to support preparation and are listed in Table 8. Davison grade 952 silica is commercially available from Davison Chemical Company, a division of W.R. Grace & Co. Aluminophosphate (AlPO$_4$) supports were prepared in accordance with U.S. Pat. No. 4,364,855, herein incorporated by reference. The data, given in Table 8, show that the optimum support for the present catalyst system is alumina, preferably a Ketjen B alumina.

TABLE 8

| Run | Support* | Activity, g pol/g cat/hr | Support Calcination Temp, °C | Support Surface Area, m$^2$/g | Support Pore Volume, ml/g |
|---|---|---|---|---|---|
| 101 | Ketjen B alumina | 1220 | 600 | 400 | 1.6 |
| 801 | Davison Grade 952 silica | 230 | 600 | 300 | 1.6 |
| 802 | Davison Grade 952 silica | 340 | 200 | na | na |
| 803 | Aluminophosphate (AlPO$_4$) P/Al mole ratio = 0.2 | 130 | 600 | 400 | 1.8 |
| 804 | Aluminophosphate (AlPO$_4$) P/Al mole ratio = 0.4 | 240 | 600 | 400 | 1.8 |
| 805 | Aluminophosphate (AlPO$_4$) P/Al mole ratio = 0.6 | 545 | 600 | 350 | 1.8 |
| 806 | Aluminophosphate (AlPO$_4$) P/Al mole ratio = 0.9 | 475 | 600 | 265 | 1.8 |
| 807 | Aluminophosphate (AlPO$_4$) P/Al mole ratio = 0.9 | 475 | 600 | 265 | 1.8 |

*na = not available

Example 9

Catalyst system preparation and polymerization reactions were carried out as described above. The data provided below in Table 9 show the effects of varying the calcination temperature of the Ketjen B alumina. All polymerizations were carried out using 1 ml of 15 wt % of triethylaluminum cocatalyst. The data in Table 9 show that the optimum alumina calcination temperature is around 600° C.

TABLE 9

| Run | Calcination Temperature, °C | Activity, g pol/g cat/hr |
|---|---|---|
| 901 | 250 | 300 |
| 902 | 300 | 270 |
| 903 | 600 | 730 |
| 904 | 800 | 520 |

Example 10

The following experiments demonstrate the use of other calcination treatments for the alumina support. Ketjen B support treatment was varied, as described in Table 10, below. The data in Table 10 show that treatment of the support with any other type of activator is not necessary. However, Run 1001 teaches that impregnation of Ketjen B alumina with 5% ammonium bifluoride can improve catalyst system activity.

TABLE 10

| Run | Support Treatment | Activity, g pol/g cat/hr |
|---|---|---|
| 101 | none | 1220 |
| 1001 | impregnate with 5% ammonium bifluoride inMeOH*; evaporate MeOH; calcine at 600° C. | 810 |
| 1002 | impregnate with 12% ammonium bifluoride in MeOH; evaporate MeOH; calcine at 600° C. | 625 |
| 1003 | calcine at 300° C. in presence of $CCl_4$ to cause deposition of chloride layer | 400 |
| 1004 | calcine at 600° C., but cure for 300° C. in presence of $SiCl_4$ for 10 minutes | 750 |

*MeOH is methanol

Example 11

This Example demonstrates the use of using tetrahydrofuran (THF) as a solvent for the zirconium tetrachloride. A solution was prepared by slowly adding one gram of $ZrCl_4$ to 100 ml of dry THF. The solution became hot with incremental addition and turned a rose color. This solution was impregnated on to 600° C. calcined Ketjen B alumina, as described earlier, except that the final concentration on the alumina was 5 weight percent zirconium. Additional curing procedures were employed for Runs 1101, 1102 and 1103, as shown in Table 11. The data in Table 11 show that an active catalyst system can be prepared using THF as a solvent for $ZrCl_4$.

TABLE 11

| Run | Catalyst System Curing Procedure | Activity, g pol/g cat/hr |
|---|---|---|
| 1101 | evaporation only; no subsequent curing step | none |
| 1102 | evaporate; cure in fluidizing nitrogen for 30 minutes at 200° C. | 340 |
| 1103 | evaporate; cure in fluidizing nitrogen for 30 minutes at 200° C.; cure in fluidizing nitrogen for 30 minutes at 300° C. | 375 |

Example 12

This Example shows that active catalyst systems can be prepared from zirconium compounds other than $ZrCl_4$. The zirconium loading in Run 1201 was 8 weight percent zirconium and all other Runs were 5 weight percent zirconium. The zirconium compound used, the preparation procedure and catalyst system treatment are provided in Table 12. Some Runs had TEA cocatalyst (1 ml of 15 weight % of TEA in hexanes) added to the reactor and some of the runs had ethylaluminum dichloride (EADC) (1 ml of 15 weight % EADC in hexanes) added to the reactor. Some Runs had no additional aklyl aluminum compounds added to the reactor. The results are given below in Table 12.

TABLE 12

| Run | Zr Compound** | Treatment | TEA Added | Activity, g pol/g cat/hr |
|---|---|---|---|---|
| 1201 | $ZnI_4$ | Cure in $N_2$ at 250° C. for 30 minutes | Yes | 12 |
| 1202 (a) | Dicyclopentadienyl Zr | Cure at 80° C. | Yes | 0 |
| 1202 (b) | Dicyclopentadienyl Zr | Cure at 200° C. | Yes | 300 |
| 1203* | Zr(tetrabutoxide) in butanol | Cure at 400° C. adding 2cc of trichlorohydrosilane | Yes | 800 |
| 1204(a) | Zr(tetrapropoxide) | Cure at 200° C. | Yes | None |
| 1204(b) | Zr(tetrapropoxide) | Cure at 200° C. | No, but used EADC | None |
| 1204(c) | Zr(tetrapropoxide) | Cure at 200° C. in presence of $SiCl_4$ vapor | Yes | 710 |
| 1204(d) | Zr(tetrabutoxide) | Cure in 2 200° C., $CH_4$ vapor at 400° C., $N_2$ $SiCl_4$ at 300° C. | Yes | 680 |
| 1205 | Zr(tetrabutoxide) | Cure in air at 600° C., $CCl_4$ vapor in $N_2$ at 600° C. | Yes | 860 |

*uncalcined alumina
**all Zr loadings are in terms of weight percent

Example 13

In another variation of the preparation described above in steps 1 through 5, zirconium tetrachloride was dissolved in toluene by adding a small amount of butanol. Into 100 ml of toluene was added 4.2 gm of Zr as $ZrCl_4$ and 1.3 moles of butanol per mole of zirconium. Zirconium tetrachloride reacted with butanol sufficiently to dissolve in the toluene. This solution then was used to make 5 weight % Zr catalyst from 600° C. calcined alumina. Curing was done at 110° C. under nitrogen. This catalyst system had only marginal activity, 85 gm PE per gm catalyst per hour, when tested with 1 ml of 15 wt % TEA cocatalyst. However, in a repeat preparation wherein the curing was done at 250° C. in nitrogen, the activity improved to 500 gm PE per gm catalyst per hour.

Example 14

A catalyst system was prepared by impregnating Ketjen B alumina which had been previously calcined by dry air at 600° C. for three hours, with 40 mls of a solution consisting of 31 mls of heptane and 9 mls of 80 wt % zirconium tetrabutoxide in butanol. After evaporating off the heptane and butanol, the catalyst system contained 1 mmol Zr/g or approximately 9% Zr by weight. The material then was calcined in fluidizing dry nitrogen at 500° C., into which was evaporated 3 mls of carbon tetrachloride. The finished catalyst system was stored under dry nitrogen at room temperature.

In a polymerization run, 0.4585 grams of this catalyst system was charged to the reactor along with 1 ml of 1M TEA solution. Isobutane and then ethylene at 550 psig were added as previously disclosed. After 37 minutes, the reactor was depressurized and opened, and 247 grams of polyethylene powder was removed. This corresponds to an activity of 862 gpol/gcat/h. The polymer had an MI and HLMI of zero.

In a second polymerization run 0.6069 grams of this catalyst system again was charged to the reactor. A second catalyst system, based on titanium and magnesium chlorides and commercially available from Davision Chemical Company, a division of W.R. Grace & Co. as Sylopol® 5950, also was added to the reactor in an amount of 0.0262 grams. Then 1 ml of 1M TEA was added along with isobutane, ethylene at 550 psig, and 140 psig of hydrogen. After 63 minutes the reactor was opened and 84 grams of polymer removed. After milling, the polymer was found to have a melt index of 1.5 g/10 minutes, a high load melt index of 215 g/10 minutes for a HLMI/MI shear response of 142. The high shear response indicates that the polymer has a bimodal or very broad molecular weight distribution. This polymer was found by size exclusion chromatography to have a weight average molecular weight ($M_w$) of 182,000 and a number average molecular weight ($M_n$) of 6,200, giving a polydisperisty ($M_w/M_n$) of 29.2, which is exceptionally broad. While not wishing to be bound by theory it is believed that the zirconium catalyst system of this invention has a much lower response to hydrogen than normal titanium chloride based catalyst systems like Sylopol®, giving the polymer an extreme breadth of molecular weight distribution. In comparison, commercially available chromium-based catalyst systems producing this MI, generally give a shear response in the 40–60 range.

While this invention has been described in detail for the purpose of illustration, it is not to be construed or limited thereby. This detailed description is intended to cover all changes and modifications within the spirit and scope thereof.

That which is claimed is:

1. A loop/slurry polymerization process comprising:
   contacting in a reaction zone, at a temperature within a range of about 170° F. to about 230° F. in the presence of a hydrocarbon diluent having three or four carbon atoms per molecule, and in the absence of hydrogen:
   a) ethylene monomer;
   b) an alpha-olefin co-monomer;
   c) a catalyst system comprising a zirconium halide impregnated onto a calcined alumina-containing support, wherein said catalyst system is cured under an inert atmosphere at a temperature of greater than about 200° C.; and
   d) an aluminum alkyl cocatalyst; and
   recovering a copolymer of ethylene.

2. The process according to claim 1, further comprising a Ziegler-Natta catalyst system.

3. The process according to claim 2, wherein the Ziegler-Natta catalyst system comprises a complex of an organometallic compound, a titanium halide, and magnesium.

4. The process according to claim 3, wherein the organometallic compound is an aluminum alkyl.

5. The process according to claim 1, wherein the alpha-olefin co-monomer is 1-hexene.

6. The process according to claim 1, wherein the reaction zone temperature is within a range of about 180° F. to about 210° F.

7. The process according to claim 1, wherein the alumina-containing support comprises at least 75 weight percent alumina.

8. The process according to claim 1, wherein the support is essentially alumina.

9. The process according to claim 1, wherein the catalyst system particle size is within a range of about 2 to about 20 microns.

10. The process according to claim 1, wherein the aluminum alkyl cocatalyst has a formula selected from $AlR_3$, $AlR_2X$, $AlRX_2$, or mixtures thereof, wherein R is an alkyl group having from about 1 to about 12 carbon atoms per molecule and X is a halogen atom.

11. The process according to claim 1, wherein the aluminum alkyl cocatalyst is selected from triethylaluminum, triisobutyl aluminum, or mixtures thereof.

12. The process according to claim 1, wherein the aluminum alkyl cocatalyst is present in the reactor in an amount within a range of about 5 to about 500 mg/kg, based on the mass of reactor diluent.

13. The process according to claim 1, wherein the catalyst system and aluminum alkyl cocatalyst are contacted prior to contacting the ethylene monomer.

14. The process according to claim 1, further comprising a second catalyst system comprising a titanium halide containing catalyst.

15. The process according to claim 1, wherein the catalyst system is cured under an inert atmosphere at a temperature of greater than about 250° C.

16. The process according to claim 1, wherein the catalyst system is cured under an inert atmosphere at a temperature from about 250° C. to about 600° C.

17. The process according to claim 1, wherein the inert atmosphere is nitrogen.

18. The process according to claim 1, wherein the temperature in the reaction zone is within a range of about 170° F. to about 220° F.

19. A polymerization catalyst system comprising:
   a catalyst comprising a zirconium halide impregnated calcined alumina support cured at a temperature of greater than about 200° C., the alumina support having been calcined at a temperature of greater than about 300° C. prior to impregnation;
   an aluminum alkyl cocatalyst; and
   optionally, a Ziegler-Natta catalyst system.

20. The system according to claim 19, wherein the Ziegler-Natta catalyst system comprises a complex of an organometallic compound, a titanium halide, and magnesium.

21. The system according to claim 20, wherein the organometallic compound is an aluminum alkyl.

22. The system according to claim 19, wherein the Ziegler-Natta catalyst system comprises a titanium halide containing catalyst.

23. A polymerization reactor catalyst system comprising a catalyst comprising a halided alumina support impregnated with a zirconium alkoxide.

24. The system according to claim 23, wherein the zirconium alkoxide is selected from zirconium tetrapropoxide, zirconium tetrabutoxide, or mixtures thereof.

25. The system according to claim 23, wherein said zirconium alkoxide is dissolved in an inorganic solvent prior to impregnation onto the alumina support.

26. The system according to claim 23, wherein the zirconium alkoxide impregnated alumina is halided at an elevated temperature.

27. A loop/slurry polymerization process comprising:
   contacting in a reaction zone, at a temperature within a range of about 170° F. to about 230° F. in the presence of a hydrocarbon diluent having three or four carbon atoms per molecule:
   a) ethylene monomer;
   b) an alpha-olefin co-monomer;
   c) a first catalyst system comprising a zirconium halide impregnated onto a calcined alumina-containing support, wherein said catalyst system is cured under an inert atmosphere at a temperature of greater than about 200° C.;

d) an aluminum alkyl cocatalyst; and
e) a second catalyst system selected from a Ziegler-Natta catalyst system or a titanium halide containing catalyst system; and recovering a copolymer of ethylene.

28. The process according to claim 27, wherein the Ziegler-Natta catalyst system comprises a complex of an organometallic compound, a titanium halide, and magnesium.

29. The process according to claim 28, wherein the organometallic compound is an aluminum alkyl.

30. The process according to claim 27, wherein hydrogen is present in the reaction zone.

31. The process according to claim 30, wherein hydrogen is present in the reaction zone 0.1 mole percent to about 0.2 mole present based on the weight of the diluent.

* * * * *